United States Patent [19]

Fukuda

[11] Patent Number: 5,781,237
[45] Date of Patent: Jul. 14, 1998

[54] VIDEO CODING APPARATUS AND VIDEO CODING METHOD

[75] Inventor: Hideki Fukuda, Katano, Japan

[73] Assignee: Matsushita Electric Industrial Co., Ltd., Osaka-fu, Japan

[21] Appl. No.: 407,665

[22] Filed: Mar. 21, 1995

[30] Foreign Application Priority Data

Mar. 25, 1994 [JP] Japan .................................. 6-055535
Mar. 25, 1994 [JP] Japan .................................. 6-055536

[51] Int. Cl.$^6$ .............................. H04N 7/12; H04N 11/02
[52] U.S. Cl. .................................................. 348/405
[58] Field of Search .................................. 348/405, 419, 348/416, 415, 409, 402, 401, 400, 423, 390, 384

[56] References Cited

U.S. PATENT DOCUMENTS

| | | |
|---|---|---|
| 5,144,426 | 9/1992 | Tanaka et al. . |
| 5,291,282 | 3/1994 | Nakagawa et al. ............ 348/384 |
| 5,349,384 | 9/1994 | Oguro ............................ 348/405 |
| 5,537,440 | 7/1996 | Eyuboglu et al. ............. 375/245 |

*Primary Examiner*—Andrew Faile
*Assistant Examiner*—Aung S. Moe
*Attorney, Agent, or Firm*—Wenderoth, Lind & Ponack

[57] ABSTRACT

N pieces of quantized data are generated by quantizing video signals in quantizing widths proportional to N temporary quantizing parameters Q(i). N temporary coded bit streams S(i) are generated by variable length coding the N pieces of quantized data. A code quantity B(i, j) of the temporary coded bit streams S(i) is measured in a second specific period t(j) which is one of n periods divided from a first specific period T. A function f(q, j) is estimated by relating a quantizing parameter q having continuous values and a code quantity b(j) of coded bit streams in the second specific period t(j) with the function of b(j)=f(q, J), by using the temporary quantizing parameter Q(i) and the code quantity B(i, j). An assigned code quantity bt(j) to be assigned to the second specific period t(j) is determined so that a code quantity of the coded bit streams in the first specific period T may be equal to a specified assigned code quantity BT assigned in the first specific period T. The video signals in the second specific period t(j) are quantized again by using the assigned code quantity bt(j) to obtain re-quantized data, and an output coded bit stream is obtained by variable length coding the requantized data.

11 Claims, 11 Drawing Sheets

VIDEO CODING APPARATUS AND VIDEO CODING METHOD

BACKGROUND OF THE INVENTION

1. Field of the Invention

The invention relates to a video coding apparatus used when recording a video signal on an optical disk or a magnetic disk by compressed variable length coding, or when transmitting by using a transmission system having a variable bit rate, a video coding method for assigning a code quantity depending on a video signal, a video reproducing apparatus for reproducing a video signal from a medium on which a code row obtained by compressed variable length coding is recorded, and an optical disk.

2. Description of the Prior Art

Recently, as a coding method of video signals, it is general to employ a transform coding method for performing discrete cosine transform or other orthogonal transform in every block, by dividing a picture into blocks composed of adjacent plural pixels. In this method, a transform coefficient is quantized by a specific quantizing width, and is compressed and coded by using a variable length code such as Hafman code.

In coding of, furthermore, moving picture of television signals or the like, an inter-frame coding making use of correlation between frames is attempted. In the inter-frame coding, a frame before or after an object frame to be coded in time is used as a reference frame, and the object frame is predicted, and a predictive error signal of the object frame is coded, transmitted, and recorded. Prediction between frames is performed in every block composed of plural pixels, and a motion quantity of each block is detected and motion compensated. Therefore, the motion quantity of each block is transmitted and recorded together with the predictive error signal.

In these steps, since the variable length code is used, generated bit quantity can be recognized only after coding process. Therefore, to settle the generated bit quantity within a specific assigned bit quantity, it is a general method to compare the generated bit quantity with the assigned bit quantity, and update the assigned bit quantity depending on a result of the comparison, which is known as feed-forward control method. This method is capable of controlling within a specified bit quantity without enlarging a coding delay.

Also is proposed a feedback control method, in which the generated bit quantity is measured by quantizing in plural quantizing widths to obtain a measuring point, and the quantizing width and the generated bit quantity are estimated by linear approximation using the measuring point (Japanese Laid-open Patent Application No. 3-3479).

Thus, various methods have been proposed in order to settle the variable length coding data within a specific assigned bit quantity. It was because, when a transmission speed of codes of communication or broadcast was constant, it was necessary to control a code quantity in a coding apparatus so as not to exceed a occupation capacity of a buffer memory in a reproducing apparatus.

However, since, depending on a difference in time information quantity and space information quantity possessed by video signals, a degree of difficulty of compressive coding differs, a picture quality is not kept constant when video signals are coded at a specific fixed bit quantity, and the picture quality deteriorates extremely in a picture of high degree of difficulty.

Moreover, when recording on a medium such as an optical disk and a magnetic disk, coded data may be read from the medium only when a decoding circuit requests reading of coded data. Therefore, as far as limitation of maximum transfer speed of the coded data and limitation of time of video signals to be recorded in the medium are satisfied, a coding speed is not required to be constant. That is, by intermittently reading from the optical disk or the magnetic disk, the same effect as varying bit rates is obtained.

SUMMARY OF THE INVENTION

It is hence a primary object of the invention to present an apparatus and a method capable of assigning a code quantity suited to a video signal, accurately and easily, by relating a quantizing parameter and a generated code quantity by using a function, when recording video signals, on a recording medium such as an optical disk and a magnetic disk, or when transmitting the video signals by using a transmission system corresponding to a variable bit rate, and capable of controlling a generated code quantity accurately by using the function.

To achieve the object, the invention presents a compression coding apparatus for compression coding video signals, comprising means for generating N (N is a natural number) pieces of quantized data by quantizing the video signals in quantizing widths proportional to N temporary quantizing parameters $Q(i)$ (i is a natural number equal to or smaller than N), means for variable length coding the N pieces of quantized data to generate N temporary coded bit streams $S(i)$, means for measuring a code quantity $B(i, j)$ (j is a natural number of 1 to n) of the temporary coded bit streams $S(i)$ in each of second specific period $t(j)$ which is one of n (n is a specific natural number) periods divided from a first specific period T divided into, means for estimating a function $f(q, j)$ by relating a quantizing parameter q having continuous values and a code quantity $b(j)$ of coded bit streams in the second specific period $t(j)$ with the function of $b(j)=f(q, j)$, by using the temporary quantizing parameter $Q(i)$ and the code quantity $B(i, j)$, code quantity assigning means for determining an assigned code quantity $bt(j)$ to be assigned to the second specific period $t(j)$ so that a code quantity of the coded bit streams in the first specific period T may be equal to a specified assigned code quantity BT assigned in the first specific period T, and re-coding means for quantizing again the video signals in the second specific period $t(j)$ by using the assigned code quantity $bt(j)$ to obtain re-quantized data, and variable length coding the re-quantized data to obtain an output coded bit stream.

An optical disk of the invention records coded bit streams obtained by the compression coding apparatus.

A video reproducing apparatus of the invention is an apparatus for processing video signals by compression variable coding in the second specific period by using the assigned code quantity, reading out the output coded bit streams obtained by multiplexing the assigned code quantity or the code quantity of the second specific period from a recording medium, and outputting reproduced video signals generated from the output coding bit stream, wherein the assigned code quantity or the code quantity is decoded from the output coded bit stream, the output coded bit stream of a second code quantity defined by the assigned code quantity or the code quantity are read out from the recording medium within the second specific period, and the output coded bit stream are decoded, and the reproduced video signals are output.

According to the invention, in the second specific period t having the first specific period T divided into n, the estimate quantizing parameter and the code quantity are related with a function, and the second code quantity in the second specific period t is assigned, so that an optimum code quantity assignment depending on a degree of difficulty in coding the video signals is achieved. An average of a coding rate is determined by the first specific period T, and hence the coding rate of each scene of the second specific period t Is variable. For example, supposing the first specific period T to be a period of an entire picture to be recorded in a recording medium, the code quantity is determined by the entire picture to be recorded, so that a high quality may be maintained throughout an entire reproduced picture.

DESCRIPTION OF THE PREFERRED EMBODIMENTS

Figure 1:
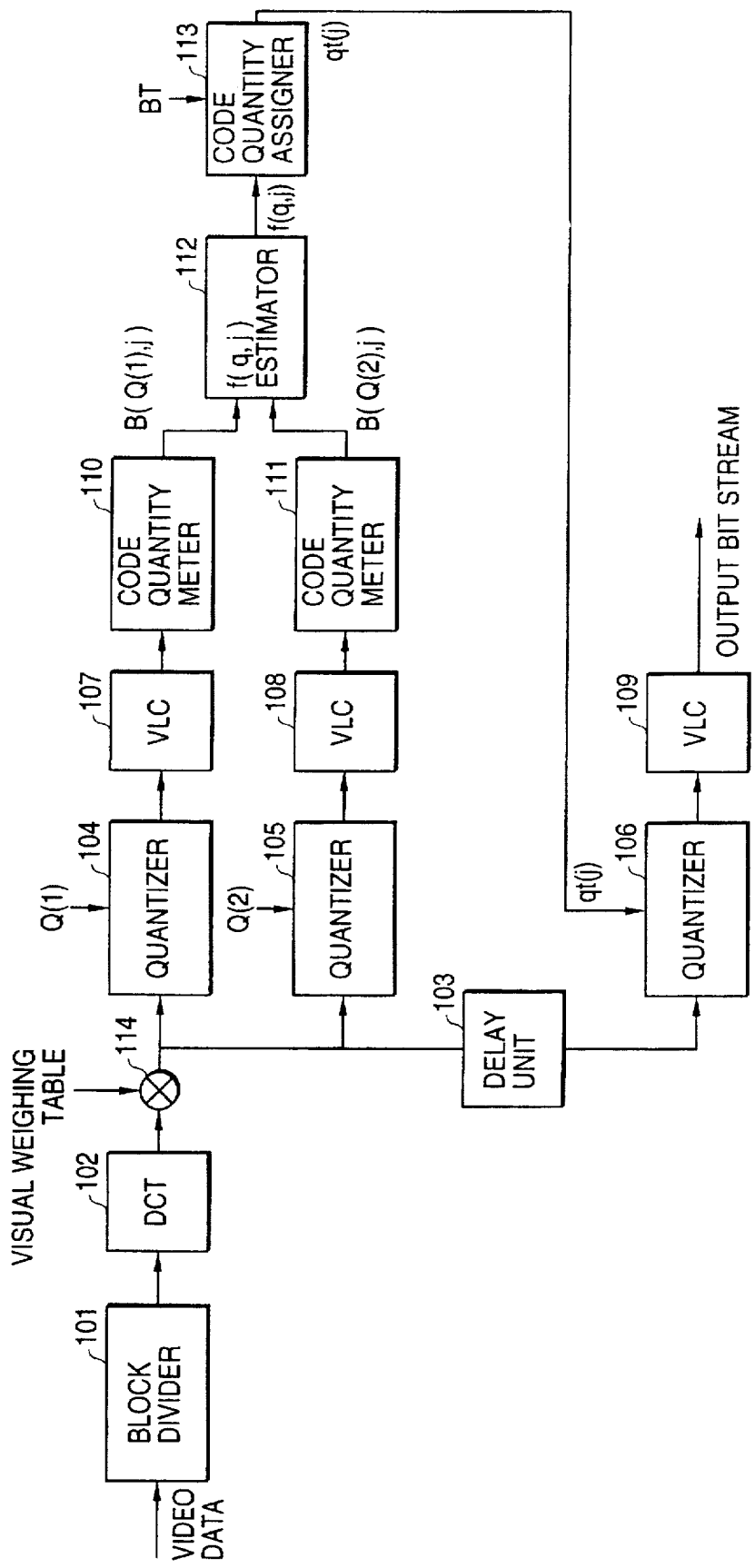
FIG. 1 is a block diagram of a video coding apparatus in a first embodiment of the invention.

An embodiment of a video coding apparatus of the invention is described below while referring to the drawings. Herein, one of periods having a first specific period T divided into n (n is an integer greater than 1) is explained as a period t(j), where j is an integer expressing time ranging from 1 to n. For example, supposing T to be a time for 300 frames, when it is divided into 10, the period t(j) is time for 30 frames. For simplicity of explanation, intra-frame coding method is employed.

FIG. 1 is a block diagram of a video coding apparatus in a first embodiment of the invention. Input video data are divided into blocks composed of plural pixels in a block divider 101. Next, discrete cosine transform (DCT) is effected by a DCT device 102, and a transform coefficient is weighted according to visual characteristics of a human being in a multiplier 114. A block of a weighted transform coefficient is fed into a first quantizer 104 and a second quantizer 105. The first quantizer 104 quantizes the block of the weighted transform coefficient in a quantizing width proportional to a temporary quantizing parameter Q(1), and the second quantizer 105 quantizes the block in a quantizing width proportional to a temporary quantizing parameter Q(2). Herein, Q(i) denotes one of specific N (N is an integer greater than 0) temporary quantizing parameters. In this case, N=2, and i is 1 or 2.

A first variable length coder 107 processes an output of the first quantizer 104 by variable length coding to output a first bit stream, and a second variable length coder 108 processes an output of the second quantizer 105 by variable length coding to output a second bit stream. A first coding quantity meter 110 measures and outputs code quantity B(1, j) of the first bit stream with the period t(j), and a second code quantity meter 111 measures and outputs code quantity B(2, j) of the second bit stream with the period t(j). Herein, B(i, j) is code quantity when a video signal of period t(j) is quantized and coded by a temporary quantizing parameter Q(i).

A function estimator 112 estimates a function f(q, j) by relating the generated code quantity b(j) and quantizing parameter q in the period t(j) with the function b(j)=f(q, j). In the period T, therefore, n functions from f(q, 1) to f(q, n) are estimated.

A code quantity assigner 113 determines code quantity bt(j) to be assigned in the period t(j), so that the generated code quantity in the period T may be equal to specific code quantity BT assigned in the period T. It also determines and outputs estimated quantizing parameter qt(j) to satisfy bt(j)=f(qt(j), j).

A delayer 103 delays the block of the weighted transform coefficient by the period T. A third quantizer 106 quantizes the block of the weighted transform coefficient in the period t(j) in a quantizing width proportional to the estimated quantizing parameter qt(j). A third variable length coder 109 processes an output of the third quantizer 106 by variable length coding, and outputs an output bit stream.

By thus constituting, the code quantity differs in each period t(j) in the period T, but when quantizing and coding by the quantizing parameter estimated by using the function f(q, j), the generated code quantity can be controlled accurately. As a result, in period T, a predetermined specific code quantity is achieved.

Figure 2:
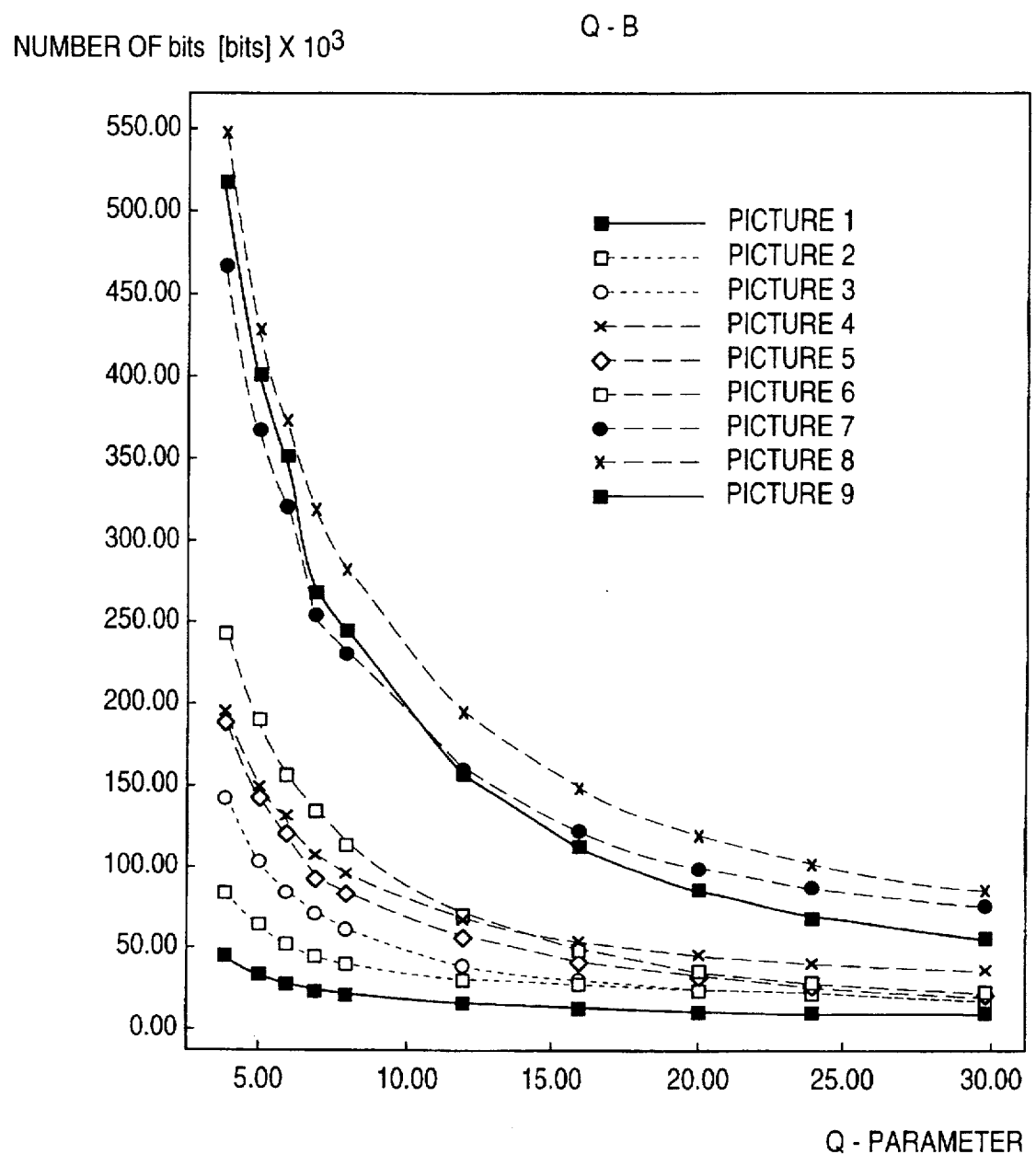
FIG. 2 is a graph showing a relation of plural quantizing parameters and generated code quantity.

FIG. 2 shows the generated code quantity by compressed variable length coding of nine types of video data by several quantizing parameters. An axis of abscissas denotes the quantizing parameters, and an axis of ordinates represents the generated code quantity.

The coding method conforms to MPEG2 main profile @ main level, and the picture size is 704×480 pixels, being coded at n=15, m=3, where n denotes a period of intra-frame coding process which is processed in every n frames, and m shows a period of forward direction inter-frame predictive coding process. Besides, the quantizing parameter is multiplied by a weighting factor depending on activity of macro block (16×16 pixels) to determine the quantizing width (MQUANT), and the weighted transform coefficient is weighted according to the visual characteristic of the human being, and quantized by this quantizing width (MQUANT) (Recommendation H. 262, ISO/IEC 13818-2, "Generic Coding of Moving Pictures and Associated Audio," ISO/IEC JTC1/SC29 WG11/N602, Committee Draft, November 1993).

According to FIG. 2, although variable with a kind of video data, as the quantizing parameter increases, the inclination of decrease of the generated code quantity becomes smaller.

Figure 3:
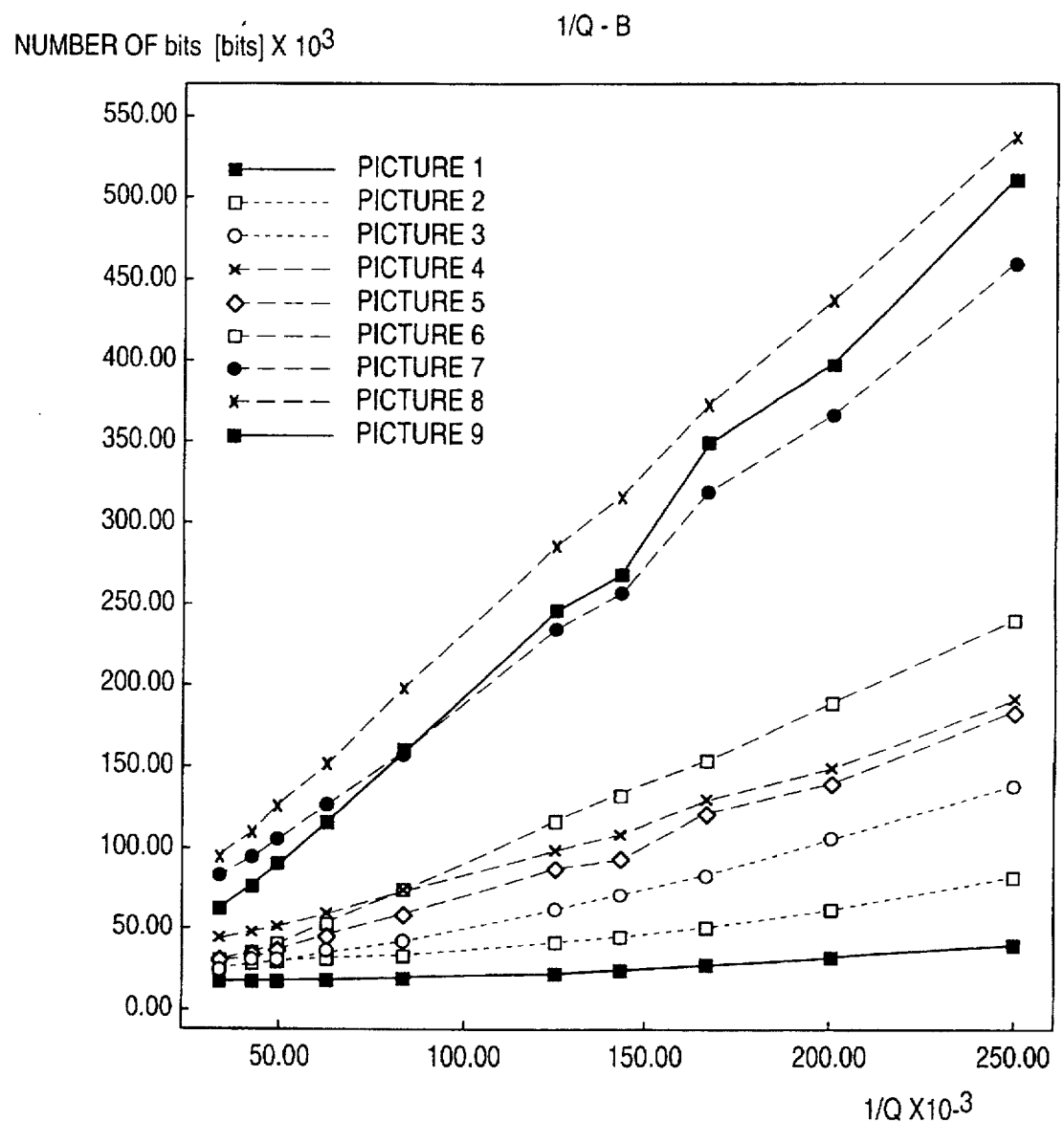
FIG. 3 is a graph showing a relation of inverse numbers of the plural quantizing parameters and generated code quantity.

FIG. 3 shows a relation of the quantizing parameter and the generated code quantity in nine types of video data processed by coding same as in FIG. 2. The axis of abscissas denotes an inverse number of the quantizing parameter.

Although the inclination of the generated code quantity differs with the kind of the video data, measuring points are aligned almost on a straight line.

It is thus possible to estimate more accurately by hyperbolic approximation, instead of linear approximation, of the quantizing parameter and the generated code quantity. In the video coding apparatus shown in FIG. 1, the function estimator 112 determines coefficients r(j), s(j) by relating the quantizing parameter q and code quantity b(j) in period t(j) with a formula (1), where r(j) and s(j) are coefficients sin period t(j).

$$b(j)+f(q,j)+r(j)/q=s(j) \tag{1}$$

Therefore, r(j) and s(j) are calculated in formulas (2) and (3).

$$r(j)=Q(1) \times Q(2) \times (B(1,j)-B(2,j))/ (Q(2)-Q(1)) \tag{2}$$

$$s(j)=b(1,j)-Q(2) \times (B(1,j)-B(2,j) /(Q(2)-Q(1) \tag{3}$$

It is possible to control the generated code quantity more accurately by relating the quantizing parameter and the generated code quantity by using the function f(q, j) In the formula (1).

The temporary quantizing parameters Q(1), Q(2) are not limited to, but it is known from FIG. 3 that linearity of the generated code quantity is excellent at Q(1)=4, Q(2)=8, and it is preferred that Q(1)=4, Q(2)=8 approximately. It is, however, desired to adjust adaptively depending on the weighting in quantizing process or difference in requested coding bit rate.

In the first embodiment, meanwhile, using the two temporary quantizing parameters, coefficients r(j) and s(j) are estimated by quantizing processing and coding processing, but, not limited to, the measuring points may be increased. As a result, although the circuit scale or coding delay may be increased, the coefficients may be estimated at high precision.

According to FIG. 3, when approximated in the formula (1), the coefficient s(j) is almost constant. Therefore, the characteristic of the generated code quantity may be approximated also by presetting the coefficient s(j) as a constant value. By thus presetting the coefficient s(j) of the formula (1), it is enough to determine the coefficient r(j) only, and the process for determining the formula (1) may be reduced. Hence, for example, the coefficient r(j) of the formula (1) may be determined only from the code quantity in the case of using one type of temporary quantizing parameter.

Figure 4:
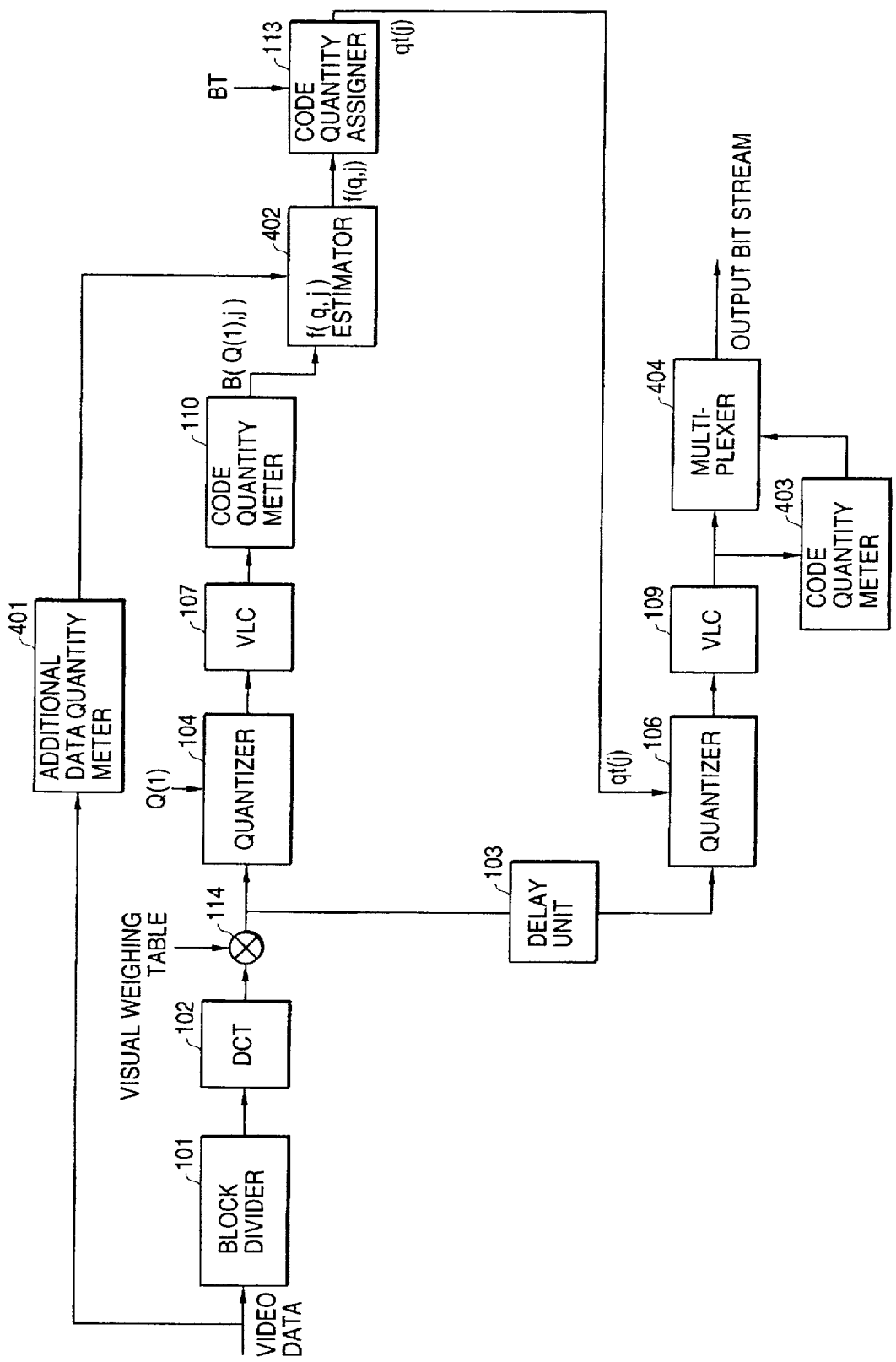
FIG. 4 is a block diagram of the video coding apparatus in a second embodiment of the invention.

FIG. 4 is a block diagram of a video coding apparatus in a second embodiment of the invention. The video coding apparatus in FIG. 4 is similar to the video coding apparatus in the first embodiment, except that an additional data quantity meter 401 is added and that the second quantizer 105, the second variable length coder 108, and the second code quantity meter 111 shown in FIG. 1 are removed. Besides, a function estimator 402 estimates the function b(j) =f(q, j) from the outputs of the first code quantity meter 110 and the additional data quantity meter 401.

Incidentally, the coefficient s(j) In the formula (1) is the code quantity that is generated even if the quantizing parameter increases infinitely, and it is interpreted as the code quantity of additional data not depending on the quantizing process. The additional data may be the code quantity necessary for coding of direct-current components of a DCT transform coefficient, the code quantity of a motion vector in a case of inter-frame predictive coding, the code quantity of coding control information, and the like.

The additional data quantity meter 401 in FIG. 4 measures the code quantity of the additional data not depending on the quantizing processing. Besides, the function estimator 402 determines the coefficient r(j) by relating the generated code quantity B(Q(1), j) and the temporary quantizing parameter Q(1) with the function of the formula (1). The coefficient s(j) of the formula (1) is defined by an output of the additional data quantity meter 401.

Accordingly, a processing for estimating the function of the formula (1) can be only a process of calculating the coefficient r(j). Therefore, for the function estimator 402, it is not necessary to use plural types of temporary quantizing parameters, and the function of the formula (1) can be determined by using only one type of temporary quantizing parameter. Therefore, the second quantizer 105, the second variable length coder 108 and the second code quantity meter 111 in FIG. 1 are not always required. Moreover, as mentioned above, by handling s(j) as the constant value, it Is possible to approximate the characteristic at higher precision.

In FIG. 4, the coefficient r(j) is calculated by using the generated code quantity with one type of temporary quantizing parameter only, but, not limited to this, plural type of temporary quantizing parameters may be also used.

The coding apparatus In FIG. 4 also comprises a third code quantity meter 403 and a multiplexer 404. The third code quantity meter 403 measures and outputs the generated code quantity in a specific period of coded bit stream as the output of the third variable length coder 109. The multiplexer 404 multiplexes the output of the third code quantity meter 403 at a specified position of coded bit stream. By incorporating these means, in a reproduced apparatus, the code quantity of specific period can be recognized, and the code quantity necessary to be read out in the specific period can be recognized.

The code quantity to be multiplexed may be an assigned code quantity assigned in the specific period by the code quantity assigner 113.

Multiplexing code quantity may be same in the first embodiment, and the generated code quantity of coded bit stream or the assigned code quantity may be multiplexed.

In the first or second embodiment, by incorporating a circuit for measuring the generated code quantity of specific period of the output bit stream, the assigned code quantity and generated code quantity may be compared, and the assigned code quantity for the next period may be updated according to the result. If the generated code quantity is larger than the assigned code quantity, the assigned code quantity of the next period is subtracted. To the contrary, if the generated code quantity is smaller than the assigned code quantity, the assigned code quantity for the next period is increased. Updating the assigned code quantity is updating the estimate quantizing parameter. In this way, the integral value of the generated code quantity of the specific period may be accurately constant.

In the block diagrams of the first and second embodiments shown in FIG. 1 and FIG. 4, the method of intra-frame coding is employed, but this is not limited to and it is same with the method of inter-frame or inter-field predictive coding.

Besides, in the case of periodic intra-frame coding and inter-frame predictive coding in other frames, the period t(j) may be determined in the unit of the period of intraframe coding. That is, supposing the period to be M frames (M is a natural number), the time is worth t(j)=k×M frames (k is a natural number). This is because the statistic nature of the coded bit stream is obtained in the period of intra-frame coding. Incidentally, the first frame of period t(j) may be a frame for intra-frame coding, or the frame for inter-frame predictive coding, and it is the same in the following examples.

In the first and second embodiments of the invention, as an example of coding process, the coding apparatus for DCT is explained, but it is same with any other apparatus as far as it is of orthogonal transform, such as discrete cosine transform and Hadamard transform, and it holds same in the following examples.

The quantizing width in quantizing processing is proportional to the quantizing parameter, but it may be weighted depending on the characteristic of the picture such as activity or motion quantity in each frame or each picture region composed of plural pixels, and it is the same hereinafter.

Figure 5:
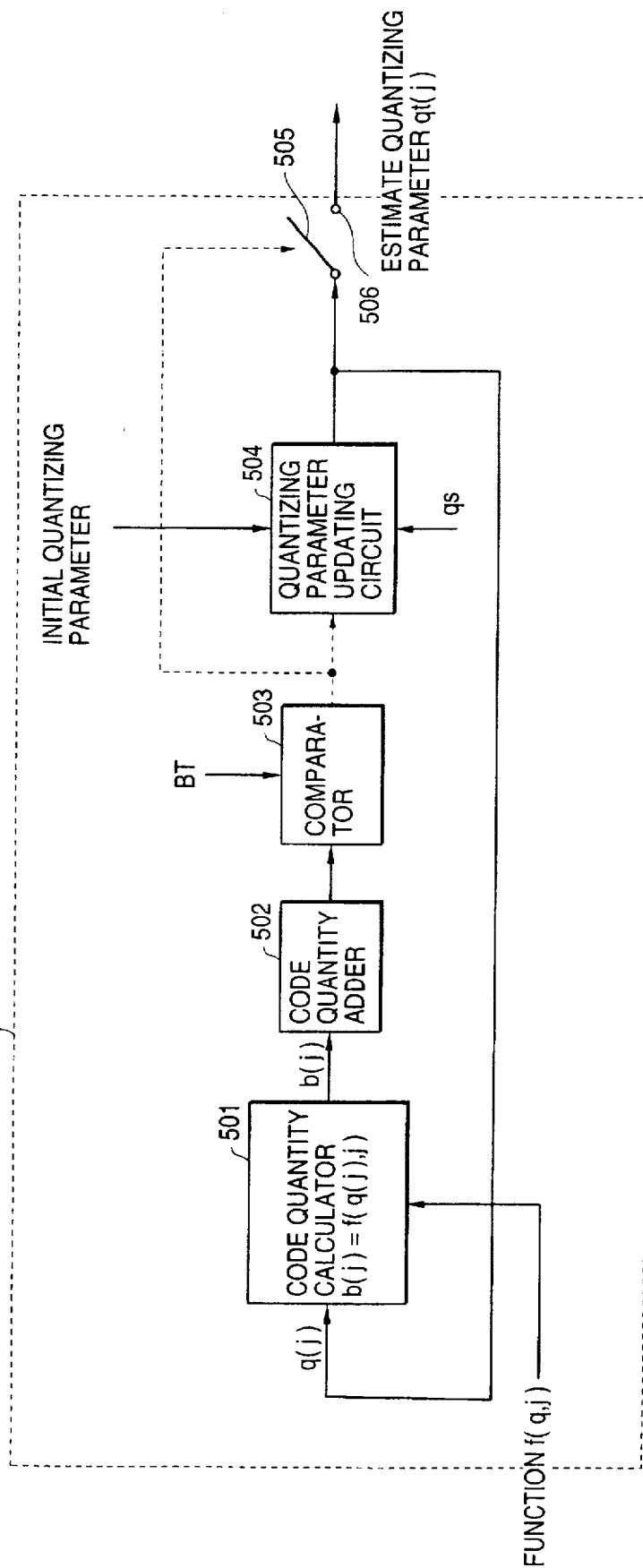
FIG. 5 is a block diagram of an example of a code quantity assigning device 113.

FIG. 5 is a block diagram of a code quantity assigner 113 shown in FIG. 1 or FIG. 2. The operation of the code quantity assigner 113 is explained below.

First, the initial quantizing parameter is fed into a quantizing parameter updating circuit 504, and the quantizing parameter q(j) is initialized. The initialized quantized parameter q(j) is fed into a code quantity calculator 501, and the code quantity b(j) in the quantizing parameter q(j) is calculated as b(j)=f(q(j), j) by using the function f(q, j). Next, a code quantity adder 502 determines and outputs the sum of n code quantities b(j) of period T. A comparator 503 compares the sum of the code quantity b(j) determined in the code quantity adder 502 and the specified code quantity BT assigned in the period T. The output of the comparator 503 is entered into a quantizing parameter updating circuit 504 and a switch 505. The quantizing parameter updating circuit 504 updates the quantizing parameter q(j) by increasing or decreasing one of n quantizing parameters q(j) by a specified amount qs, where qs is a specific positive rational number. The updated quantizing parameter q(j) is entered again in the assigned code quantity calculator 501. Processing in the quantizing parameter updating circuit 504, assigned code quantity calculator 501, code quantity adder 502 and comparator 503 is continued until the output of the code quantity adder 502 becomes equal to the specified code quantity BT, and when equalized, the switch 505 is connected with a terminal 506, thereby outputting an estimate quantizing parameter qt(j).

In updating processing of quantizing parameter, however, it is updated so that the sum of the final estimate quantizing parameters qt(j) may be minimum.

When the output of the code quantity adder 502 of the first time is greater than the specified code quantity BT, the quantizing parameter updating circuit 504 adds a specified quantity qs to one of the n quantizing parameters q(j), and may update by increasing the quantizing parameter until the output of the code quantity adder 502 becomes smaller than the specified code quantity BT. This Is achieved by setting the initial quantizing parameter in a sufficiently small value.

To the contrary, when the output of the code quantity adder 502 of the first time is smaller than the specified code quantity BT, the quantizing parameter updating circuit 504 decreases one of the n quantizing parameters q(j) by a specified quantity qs, and may be updated by decreasing the quantizing parameter until the output of the code quantity adder 502 becomes lager than the specified code quantity BT. This is achieved by setting the initial quantizing parameter in a sufficiently large value.

Figure 6:
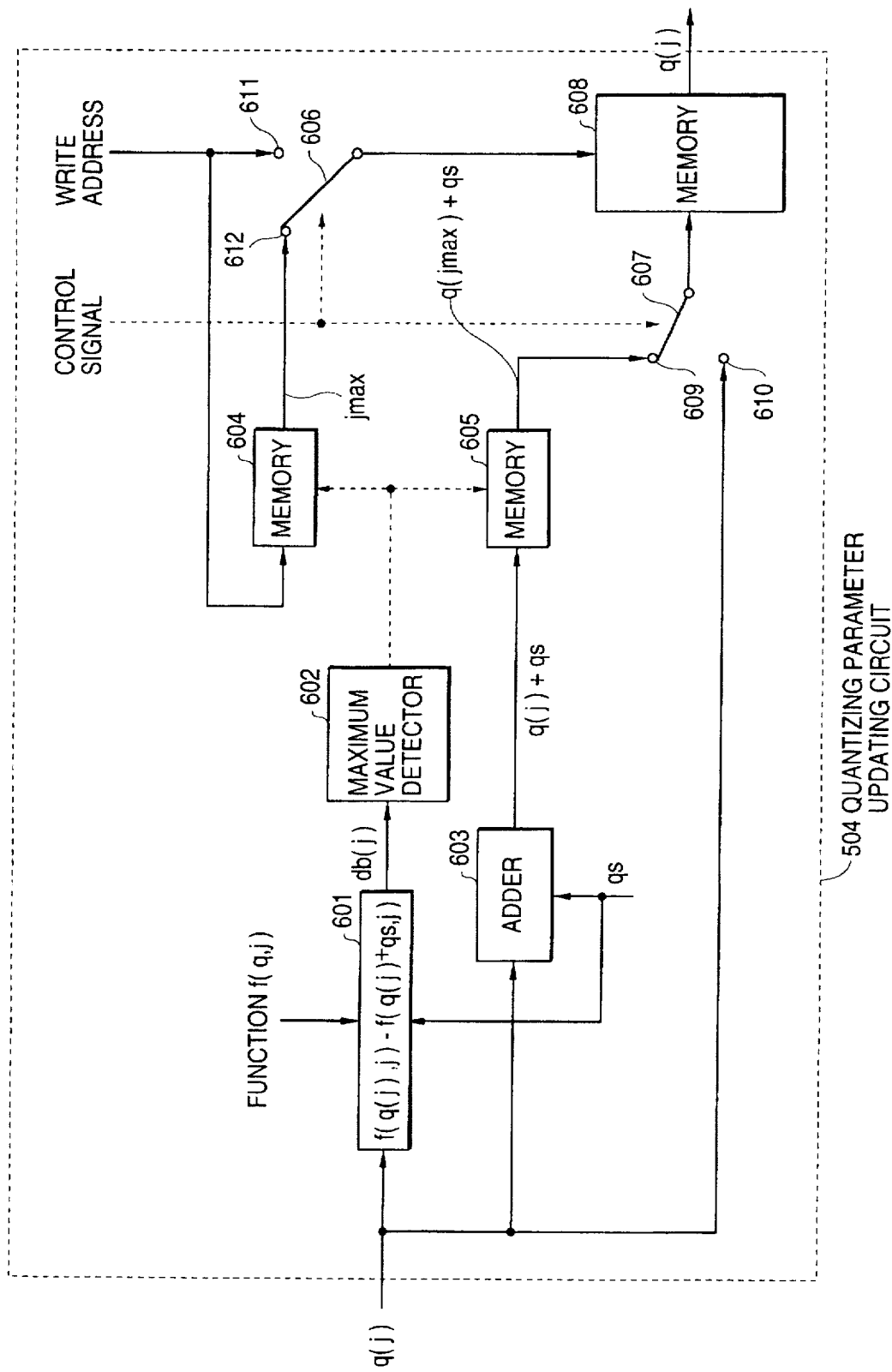
FIG. 6 is a block diagram of an example of a quantizing parameter updating circuit 504.

FIG. 6 shows a block diagram of an example of the quantizing parameter updating circuit 504 shown in FIG. 5.

In the quantizing parameter updating circuit shown in FIG. 6, supposing the initial quantizing parameter is sufficiently small, when quantizing coding is processed by the initial quantizing parameter, the generated code quantity in the specific period T is assumed to be always greater than the specified code quantity BT. Therefore, in this case, updating process of quantizing parameter is the process of only increasing one quantizing parameter by specified quantity qs alone.

In a block diagram in FIG. 6, in the initial stage, a first switch 606 is connected with a terminal 611, and a second switch 607 is connected with a terminal 610. It is also initialized in a maximum value detector 602. The first switch 606 and second switch 607 are controlled by a control signal. A quantizing parameter qt(j) is fed into a third memory 608, a decrement calculator 601, and an adder 603.

First, n quantizing parameters q(j) are sequentially stored in an address specified by a write address signal of the third memory 608. For the sake of simplicity of explanation, the address is supposed to be j. That is, q(1) is stored at address 1, and q(2), at address 2. The decrement calculator 601 calculates the decrement db(j) of the code quantity when specified quantity qs is added to the quantizing parameter q(j) according to formula (4). Herein, the specified quantity qs is a positive rational number.

$$db(j) = f(q(j), j) - f(q(j)+qs, j) \qquad (4)$$

The maximum value detector 602 detects the maximum value of outputs of the decrement calculator 601 from the initializing moment till the present moment. The adder 603 adds the specified quantity qs to the quantizing parameter q(j), and the output of the adder 603 is stored in the memory 605 only when the decrement db(j) is detected to be the maximum value at the maximum value detector 602. When the maximum value is detected by the maximum value detector 602, the write address signal is stored in the first memory 604. Of n quantizing parameters q(j), when the quantizing parameters are increased only by the specified quantity qs, supposing the quantizing parameter of the largest decrement value of the code quantity to be q(jmax), by processing of minimum value detection of decrement of code quantity on n quantizing parameters q(j), the address jmax is stored in the first memory 604, and q(jmax)+qs is stored in the second memory 605.

After processing of detection of maximum value of decrements of code quantity on n quantizing parameters q(j), the first switch 606 is connected to a terminal 612 and the second switch 607 is connected to a terminal 609. Therefore, the first memory 604 and the second memory 605 are connected to the third memory 608. In the first memory 604, address jmax is stored. At address jmax of the third memory 608, q(jmax)+qs stored in the second memory 605 is stored. That is, of the n quantizing parameters q(j), the one having a largest decrement of code word when the specified quantity qs is added to the quantizing parameter q(j) is updated as q(j)+qs. When one process of updating of quantizing parameter q(j) is over, the first switch 606, the second switch 607, and the maximum value detector 602 are initialized again to return to initial stage.

In this way, by updating the quantizing parameters and determining the estimate quantizing parameter, the number of times of updating of quantizing parameters becomes minimum, and the sum of the n quantizing parameters may be minimum. As the quantizing parameters are enlarged, the quantizing noise becomes large, and therefore by minimizing the sum of quantizing parameters, the quantizing noise can be minimized, so that the most efficient code quantity assignment is achieved.

The block diagram in FIG. 6 is only an example, and it is not definitive, and the quantizing parameter of the largest decrement of code quantity may be updated by priority.

Figure 7:
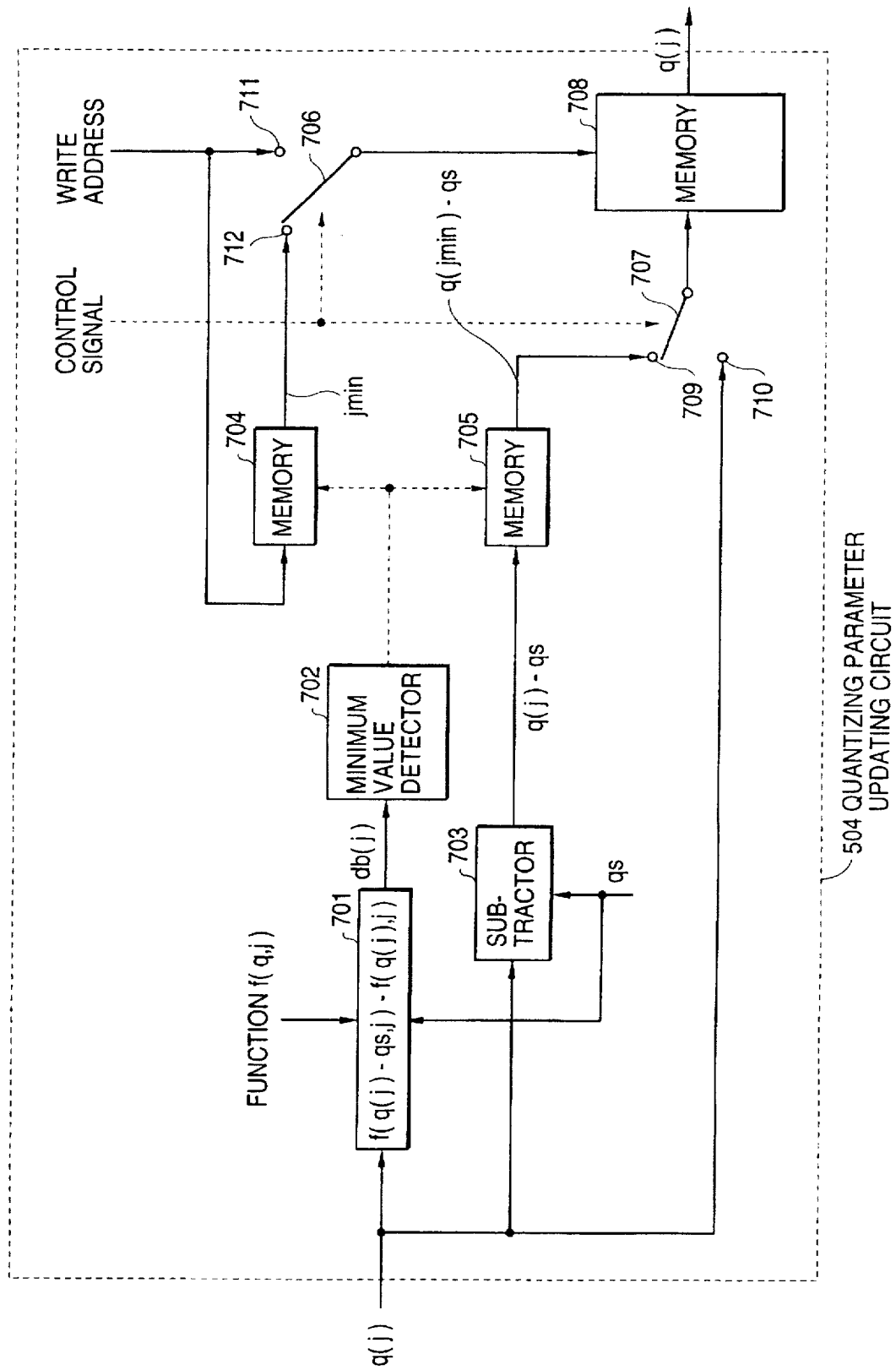
FIG. 7 is a block diagram of an example of the quantizing parameter updating circuit 504.

FIG. 7 is a block diagram of an example of the quantizing parameter updating circuit 504 shown in FIG. 5.

In the quantizing parameter updating circuit in FIG. 7, however, contrary to the quantizing parameter updating circuit in FIG. 6, the initial quantizing parameter is supposed to be sufficiently large, and when the quantizing coding is processed by initial quantizing parameter, the generated code quantity of the specific period T is supposed to be always smaller than the specified code quantity BT. In this case, therefore, updating processing of quantizing parameter is processing of only decreasing one quantizing parameter q(j) by the specified quantity qs alone.

Explaining the block diagram in FIG. 7, in the initial stage, a first switch 706 is connected to a terminal 711, and a second switch 707 is connected to a terminal 710. A minimum value detector 702 is also initialized. The first switch 706 and second switch 707 are controlled by a control signal. The quantizing parameter q(j) is fed into a third memory 708, an increment calculator 701, and a subtractor 703.

First, n quantizing parameters q(j) are sequentially stored in an address specified by a write address signal of the third memory 708. For the sake of simplicity of explanation, the address is supposed to be j. That is, q(1) is stored at address 1, and q(2), at address 2. The increment calculator 701 calculates the increment db(j) of the code quantity when the quantizing parameter q(j) is decreased by specifid quantity qs according to formula (5). The specified quantity qs is a positive rational number.

$$db(j)=f(q(j)-qs, j)-f(q(j),j) \quad (5)$$

The minimum value detector 702 detects the minimum value of outputs of the increment calculator 701 from the initializing moment till the present moment. The subtractor 703 subtracts the quantizing parameter q(j) by the specified quantity qs only, and the output of the subtractor 703 is stored in the memory 705 only when the increment db(j) is detected as the minimum value in the minimum value detector 702. When the minimum value is detected by the minimum value detector 702, a write address signal is stored in the first memory 704. Of the n quantizing parameters q(j), supposing the quantizing parameter having the largest increment of code quantity when the quantizing parameter is decreased by the specified quantity qs to be q(jmin), by processing of minimum value detection of increment of code quantity on n quantizing parameters q(j), address jmin is stored in the first memory 704, and q(jmin)−qs is stored in the second memory 705.

After processing of minimum value detection of increments of code quantity about n quantizing parameters q(j), the first switch 706 is connected to a terminal 712, and the second switch 707 is connected to a terminal 709. Therefore, the first memory 704 and second memory 705 are connected to the third memory 708. In the address jmin stored in the first memory 704 of the third memory 708, q(jmin)−qs stored in the second memory 705 is stored. That is, of the n quantizing parameters q(j), when the quantizing parameter q(j) is decreased by the specified quantity qs, the one having the largest increment of code quantity is updated as q(j)−qs. When one process of updating of the quantizing parameter q(j) is over, the first switch 706, the second switch 707 and the minimum value detector 702 are initialized again to return to initial stage.

In this way, by updating the quantizing parameters and determining the estimate quantizing parameter, the sum of the n quantizing parameters may be minimized, and since the quantizing noise increases as the quantizing parameters become larger, the quantizing noise can be minimized by minimizing the sum of the quantizing parameters, so that most efficient code word assignment is achieved.

The block diagram in FIG. 7 is only an example, and it is not definitive, and the quantizing parameter with the largest increment of code quantity may be updated by priority.

Incidentally, the quantizing parameter updating processing shown in FIG. 6 and the quantizing parameter updating processing shown in FIG. 7 may be combined. That is, when the sum of the n code quantities b(j) in specific period T is greater than the specified assigned quantity BT of the specific period T, the quantizing parameter updating processing explained in FIG. 6 is done, and when the sum of the n code quantities b(j) is smaller than the specified assigned quantity BT of the specific period T, it is changed over to carry out the quantizing parameter updating processing explained in FIG. 7. In this way, there is no problem about initial value of the quantizing parameters.

In the quantizing parameter updating circuit in FIG. 6 or FIG. 7, the specified quantity qs is not specific, but the smaller one is effective for determining the estimate quantizing parameter at higher precision, but it takes a longer time in calculation, and hence a proper value may be determined.

The specified quantity qs may be updated to a smaller value as the updating processing is advanced. In this way, the estimate quantizing parameter of higher precision can be determined by the smaller number of times of updating.

The initial quantizing parameter may be adaptively determined in consideration of the coding rate or the like.

Figure 8:
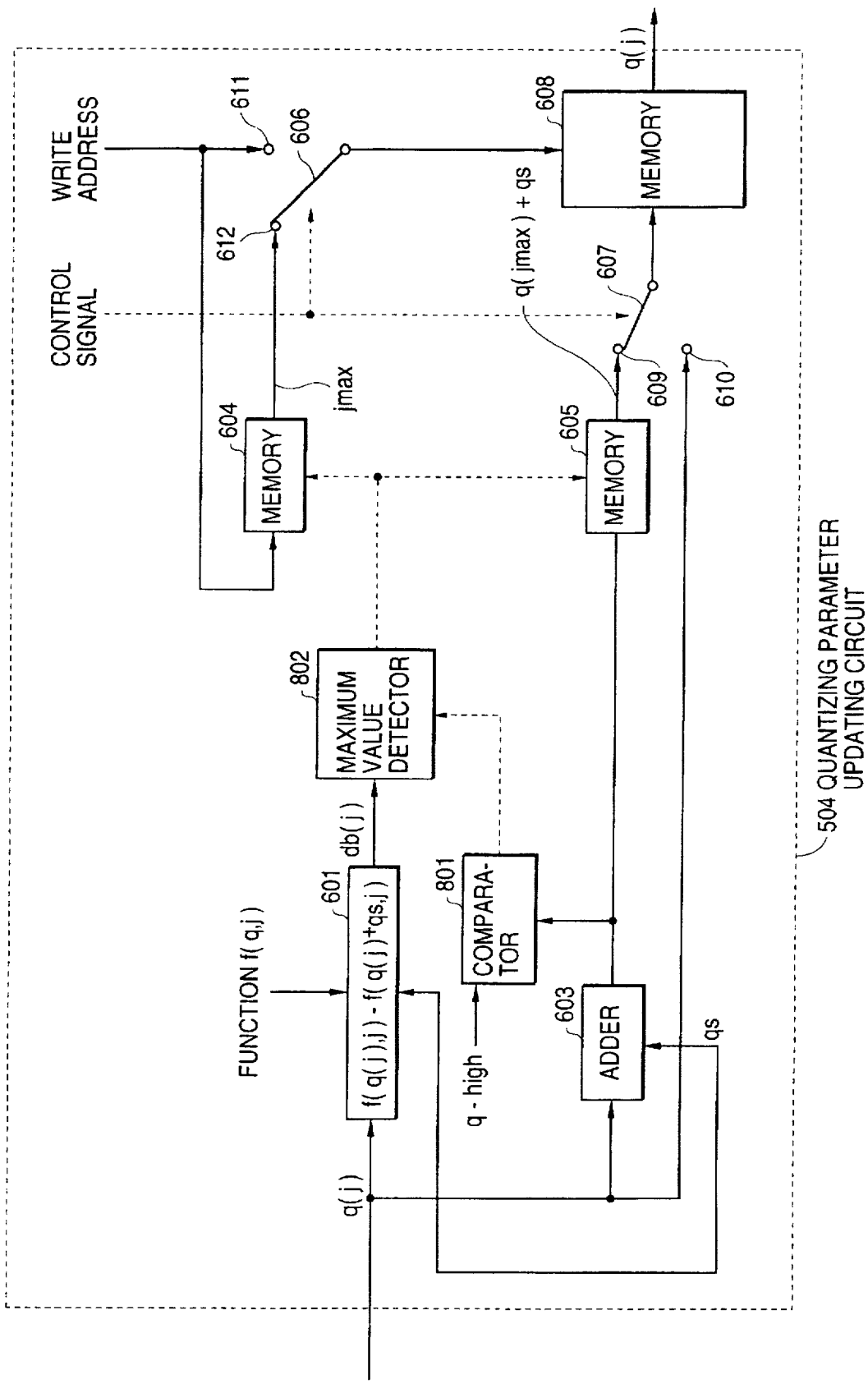
FIG. 8 is a block diagram of an example of the quantizing parameter updating circuit 504.

FIG. 8 is a block diagram of an example of the quantizing parameter updating circuit 504 shown in FIG. 5. The quantizing parameter updating circuit in FIG. 8 is realized by adding a comparator 801 to the quantizing parameter updating circuit in FIG. 6. By the output of the comparator 801, a maximum value detector 802 is put in action. The initializing quantizing parameter is a sufficiently small value, and updating processing is only to increase the quantizing parameters.

The comparator 801 compares the result q(j)+qs by adding specified quantity qs to quantizing parameter q(j) with a specified upper limit value q_high. The maximum value detector 802 detects the maximum value of outputs of the decrement calculator 601 only when q(j)+qs is smaller than the upper limit in the comparator 801.

Therefore, only the quantizing parameters of which q(j)+qs is smaller than the specified upper limit are subjected to updating processing, and the estimate quantizing parameters obtained consequently are below the specified upper limit.

In the constitution in FIG. 6, quantizing parameters are processed by updating only in the direction of adding the specified quantity qs, and hence the lower limit value of the estimate quantizing parameter is obtained as the initial quantizing parameter.

As explained in FIG. 7, meanwhile, when the initial quantizing parameter is sufficiently large, and processing is only to update to decrease the quantizing parameters, same as in the case of the quantizing parameter updating circuit in FIG. 8, only the quantizing parameters of which q(j)−qs is greater than the specified lower limit may be subjected to updating processing. In this way, the obtained estimate quantizing parameters are greater than the specified lower limit. The upper limit of the estimate quantizing parameter may be determined by the initial parameter.

When the quantizing parameter updating circuit in FIG. 6 and quantizing parameter updating circuit in FIG. 7 are combined, similarly, the lower limit and the upper limit of the estimate quantizing parameters are set.

By thus defining the upper limit of the estimate quantizing parameters, a high picture quality is obtained even in the picture of high degree of difficulty of compressive coding. Moreover, by defining the lower limit, the quantizing parameters are prevented from becoming smaller than required in the picture of low degree of difficulty. Therefore, the picture quality of reproduced video signals is kept uniform, and a general picture quality may be enhanced.

The upper limit and the lower limit may be determined at proper values depending on the entire coding rate and the like.

The quantizing parameter updating circuit shown in FIG. 8 is only an example, it is not particularly defined as far as only the quantizing parameters in a specified range are updated.

Incidentally, the upper limit and the lower limit may be defined by temporary quantizing parameters. Herein, the function of $b(j)=f(q, j)$ is estimated from the temporary quantizing parameter, but when the value of the estimate quantizing parameter is largely different from the temporary quantizing parameter, the estimation precision of the function $f(q, j)$ may be lowered. Therefore, by a maximum value or a minimum value of the temporary quantizing parameters, the updating range of estimate quantizing parameters is controlled.

Figure 9:
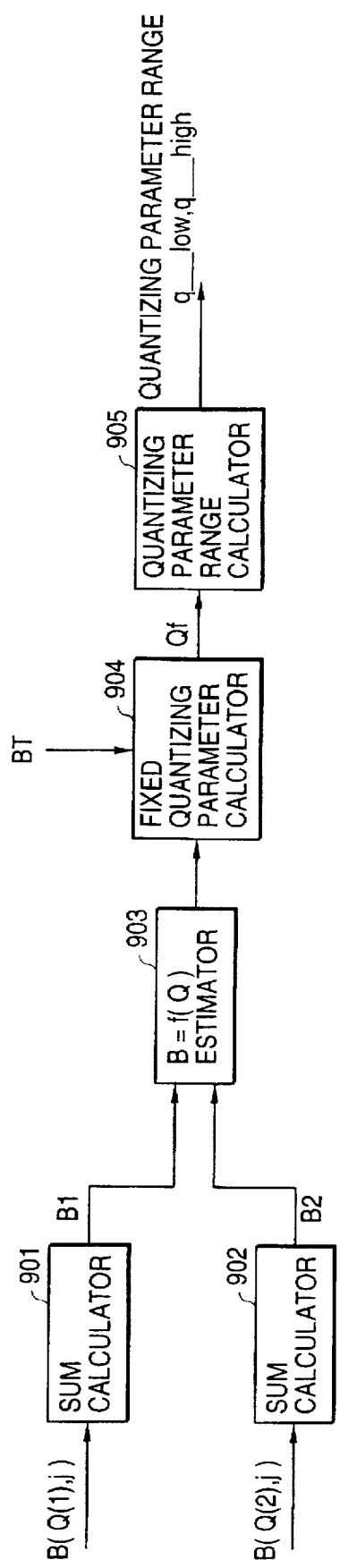
FIG. 9 is a block diagram of an example of a circuit for determining the range of estimate quantizing parameters in FIG. 8.

FIG. 9 is a block diagram of a circuit for determining the estimate quantizing parameters in the quantizing parameter updating circuit in FIG. 8.

In FIG. 9, generated code quantities $B(Q(1), j)$ and $B(Q(2), j)$ in period $t(j)$ when quantizing coding is processed by temporary quantizing parameters $Q(1)$ and $Q(2)$ are respectively fed into a first sum calculator 901 and a second sum calculator 902. The first sum calculator 901 adds the generated code quantity $B(Q(1), j)$ of period $t(j)$ over period T, and determines and outputs the generated code quantity B1 in the period T. Herein, the period $t(j)$ is one of the period T divided into n periods. The second sum calculator 902 similarly calculates the sum of $B(Q(2), j)$ in the period T, and outputs the generated code quantity B2 in the period T. A function estimator 903 estimates a function $B=F(Q)$ from the generated code quantities B1, B2 and temporary quantizing parameters $Q(1)$, $Q(2)$, or its inverse function $Q=G(B)$. This is the same as the function estimator explained in the first and second embodiments, and is intended to estimate the function in the period T. The estimated function is fed into a fixed quantizing parameter calculator 904. The fixed quantizing parameter calculator 904 determines and outputs Qf to satisfy $Bt=F(Qf)$ from the specified code quantity assigned in the period T. The Qf is a fixed quantizing parameter so that the generated code quantity may be BT when quantizing and coding is processed for the period T. A quantizing parameter range calculator 905 determines and outputs the upper limit or the lower limit, or both, of the estimate quantizing parameters from the fixed quantizing parameter Qf.

The fixed quantizing parameter Qf is also a scale showing the degree of average difficulty of video signal in the period T, and the magnitude of the quantizing parameter can be evaluated on the basis of the fixed quantizing parameter Qf. Therefore, by limiting the range of the estimate quantizing parameters by using the fixed quantizing parameter, it is possible to control adaptively by the video signal of the period T.

Alternatively, either one of the upper limit and the lower limit of the estimate quantizing parameters may be determined in the circuit in FIG. 9, and the other may be a specified value, or it may be determined depending on the magnitude of the temporary quantizing parameter.

The circuit shown in FIG. 9 is only an example, and the method of determining the fixed quantizing parameter is not limited to this, as far as the fixed quantizing parameter of the specified code quantity BT is determined when quantizing coding is processed by the same quantizing parameter in the period T. For example, in the first and second embodiments, since the code quantity is measured in every period $t(j)$, the first and second sum calculators 901, 902 are used, but they are not necessary when the code quantity of period T is directly measured from the coded bit stream.

Here, the function $B=F(Q)$ is estimated from the temporary quantizing parameters $Q(1)$ and $Q(2)$. But it is not limited to. The function $B=F(Q)$ can be estimated from one or more than two temporary quantizing parameters.

Figure 10:
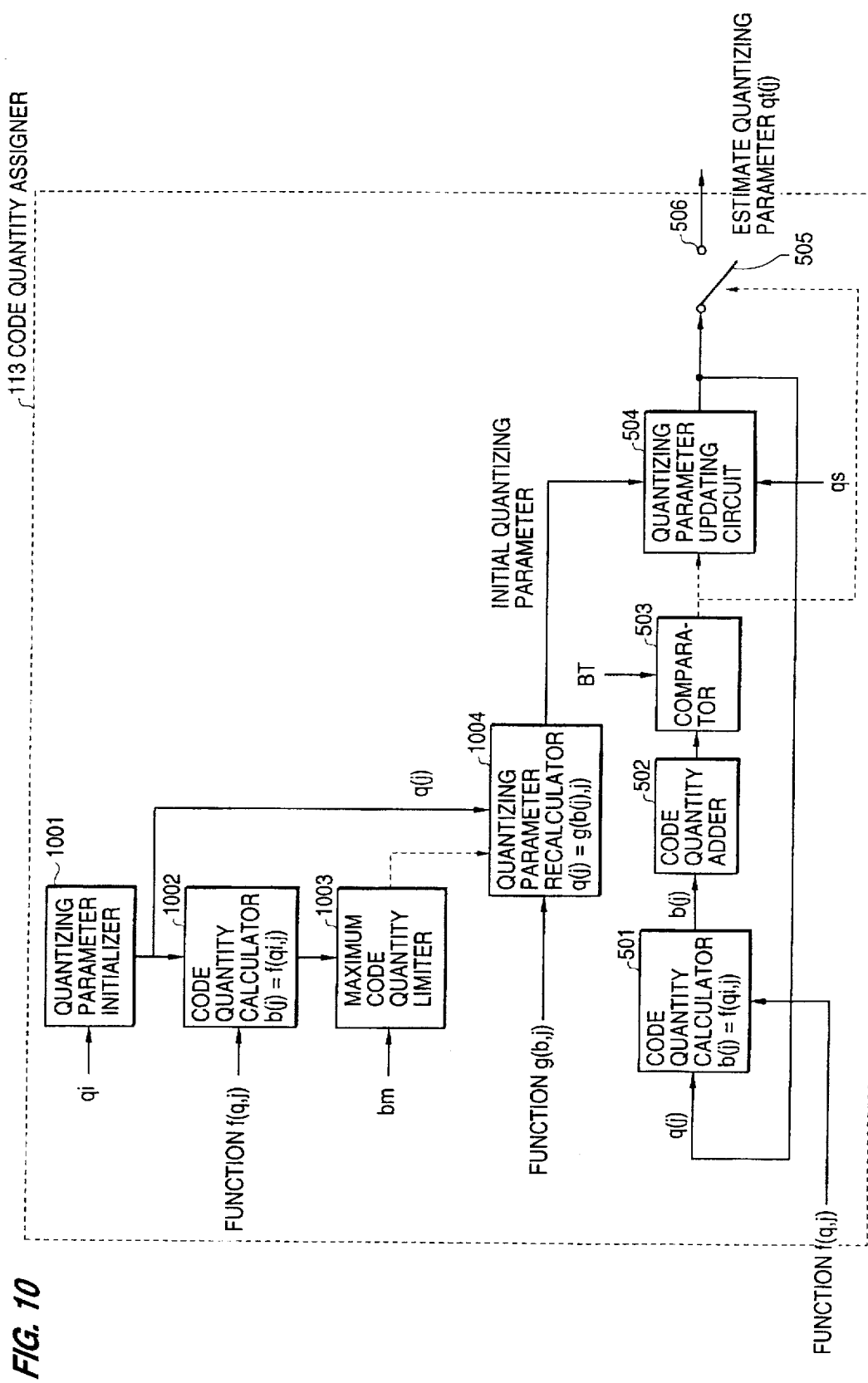
FIG. 10 is a block diagram of an example of the code quantity assigning device 113.

FIG. 10 is a block diagram of the code quantity assigner 113 shown in FIG. 1 or FIG. 4. The code quantity assigner in FIG. 10 comprises, aside from the code quantity assigner in FIG. 5, further a quantizing parameter initializer 1001, a second assigned code quantity calculator 1002, a maximum code quantity limiter 1003, and a quantizing parameter recalculator 1004, and is designed to correct the initial quantizing parameter. The operation of this code quantity assigner is described below.

First, the quantizing parameter $q(j)$ is transformed into a specified initial value qi by the quantizing parameter initializer 1001. The second code quantity calculator 1002 calculates the initial code quantity $b(j)=f(qi, j)$ from the estimated function $f(q, j)$. The maximum code quantity limiter 1003 updates the initial code quantity $b(j)$ as bm when the calculated initial code quantity $b(j)$ is larger than the specified maximum code quantity bm. The quantizing parameter recalculator 1004 calculates the quantizing parameter $q(j)$ on the code quantity $b(j)$ updated as the maximum code quantity bm. At this time, when the inverse function $q=g(b, j)$ of $b=f(q, j)$ is determined, it is enough by calculating $q(j)=g(b(j), j)$. The quantizing parameter $q(j)$ thus calculated again is fed into the quantizing parameter updating circuit 504 as initial quantizing parameter. Updating processing of the quantizing parameter is same as explained in FIG. 5 to FIG. 9. However, n assigned code quantities $bt(j)$ should not exceed the maximum code quantity bm. Therefore, the initial quantizing parameter updated so as not to exceed the maximum code quantity bm is updated so as to be further smaller.

By thus constituting, the maximum code quantity of assigned code word can be limited, and coding process depending on the maximum coding speed is realized in a reproducing apparatus.

The code quantity assigner shown in FIG. 10 is only an example, and it is not limited as far as the maximum value of the assigned code quantity can be limited. For example, by detecting to exceed the maximum value in the code quantity calculator 501, it may be constituted to correct the quantizing parameter if exceeding the maximum value. It may be also controlled so as not to exceed the maximum code quantity in the quantizing parameter updating circuit.

Incidentally, the function $f(q, j)$ showing the relation between the quantizing parameter and the code quantity may not conform to formula (1).

The function $b=f(q, j)$ may be its inverse function $q=g(b, j)$.

Figure 11:
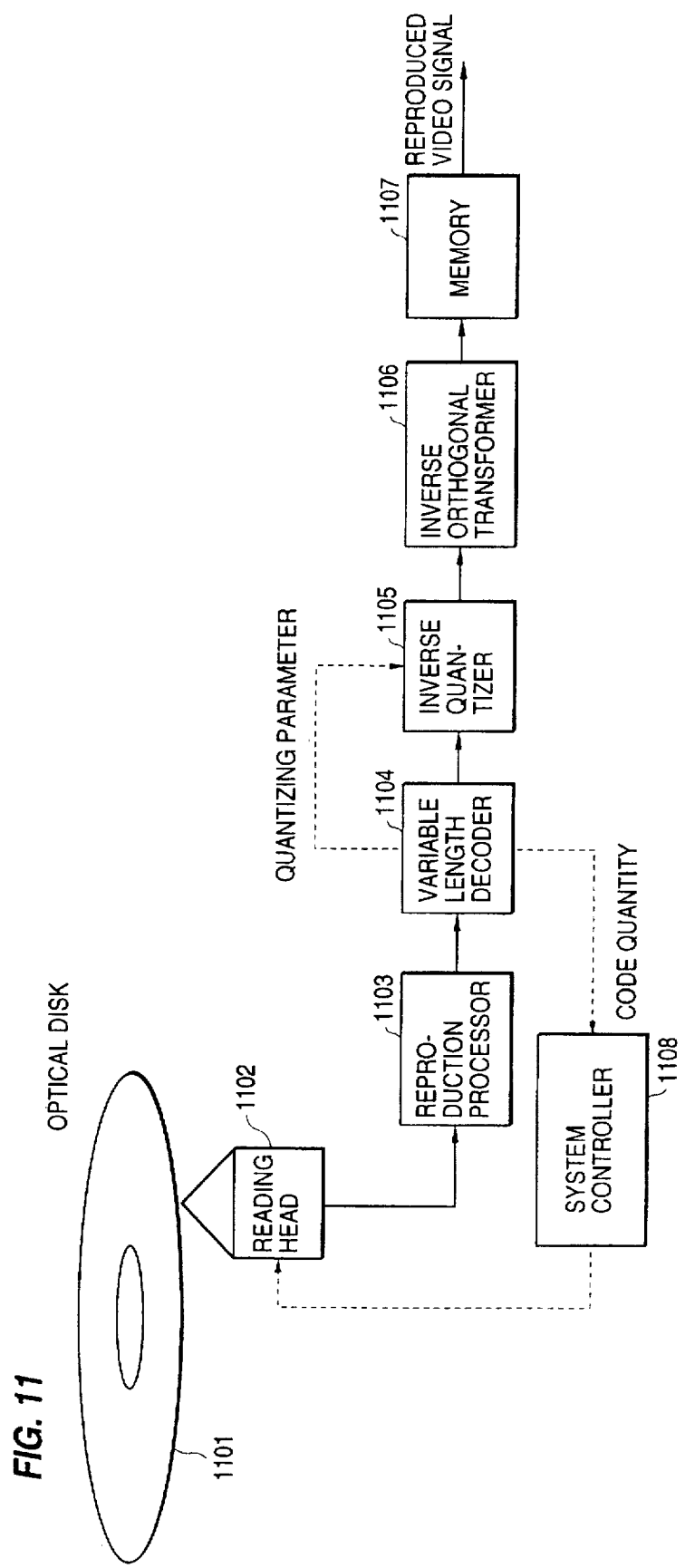
FIG. 11 is a block diagram of an optical disk and a video reproducing apparatus in a third embodiment of the invention.

FIG. 11 shows an optical disk and a video reproducing apparatus in a third embodiment of the invention. In an optical disk 1101, coding bit streams obtained by variable length coding of video signals at different code quantities in every period $t(j)$ having period T divided in n sections are recorded in a specified recording format. Coded data of code quantity of period t(j) is multiplexed on the coded bit streams. The coded bit streams may be same as used in the video coding apparatus in the first and second embodiment, but are not defined particularly.

The video reproducing apparatus Is described below. A reading head 1102 reads and outputs the recorded data from the optical disk 1101. The output of the reading head 1102 is fed into a reproduction processor 1103, and the reproduction processor 1103 accumulates data of specified code quantity, and corrects error, transforms inversely the specified recording format, and outputs coded bit streams. The coded bit streams are decoded in a variable length decoder 1104. The variable length decoder 1104 outputs the quantizing parameters, code quantity for period t(j), and quantized data of transform coefficient. The code quantity for the period t(j) is fed into a system controller 1108. The system controller 1108 controls the data reading processing of the reading head 1102 by the code quantity. That is, it is controlled to read out the data of only necessary code quantity from the optical disk so that overflow or underflow of the coded bit streams may not occur in the video reproducing apparatus.

The quantizing data and the quantizing parameters are inversely quantized in the inverse quantizer 1105, and are fed into an inverse orthogonal transformer 1106. The inverse orthogonal transformer 1106 performs inverse DCT when the coding apparatus explained in the first or second embodiment is used, but it may be any inverse transform of the orthogonal transform conducted in the coding apparatus. The inversely transformed data is put into a memory 1107, and a reproduced video signal is constructed and output.

In this way, by controlling the data reading corresponding to the code quantity for the specific period t(j), reproduction can be processed without causing overflow or underflow.

The video reproducing apparatus reproduces an optical disk in this embodiment, but the same effects are obtained with a magnetic disk.

What is claimed is:

1. A compression coding apparatus for compression coding video signals, comprising:

means for generating N (N is a specific natural number) pieces of quantized data by quantizing the video signals in quantizing widths proportional to N temporary quantizing parameters Q(i) (i is a natural number equal to or smaller than N);

means for variable length coding the N pieces of quantized data to generate N temporary coded bit streams S(i);

means for measuring a code quantity B (q, j) (i is a natural number of 1 to n) of the temporary coded bit streams S(i) in each of a second specific period t(j) which is one of n (n is a natural number) periods divided from a first specific period T;

means for estimating a function f(g, j) by relating a quantizing parameter q having continuous values and a code quantity b(j) of coded bit streams in the second specific period t(j) with a function of b(j)=f(q, j), by using the temporary quantizing parameters Q(i) and the code quantity B(q, j);

code quantity assigning means for determining an assigned code quantity bt(j) to be assigned to the second specific period t(j) so that a code quantity of the coded bit streams in the first specific period T may be equal to a specified assigned code quantity BT assigned in the first specific period T; and re-coding means for quantizing again the video signals in the second specific period t(j) by using the assigned code quantity bt(j) to obtain re-quantized data, and variable length coding the re-quantized data to obtain an output coded bit stream;

wherein the code quantity assigning means comprises quantizing parameter updating means for updating an estimate quantizing parameter qt(j) which satisfies bt(j) =f(qt(j), j) so that a sum on n estimate quantizing parameters qt(j) in the first specific period T may be minimum, and the estimate quantizing parameter qt(j) is updated until a sum of n assigned code quantities bt(j) in the first specific period T by using the n estimate quantizing parameters qt(j) becomes equal to the specified assigned code quantity BT.

2. A compression coding apparatus of claim 1, wherein the quantizing parameter updating means sets an initial value of the estimate quantizing parameter so that the sum of the n assigned code quantities bt(j) in the first specific period T is greater than the specified code quantity BT assigned in the first specific period T, and updates as qt(j)=qt(j)+qs one estimate quantizing parameter qt(j) having a largest decrement of the assigned code quantity bt(j) when the specified amount qs (qs is an arbitrary positive rational number) is added to qt(j), among the n estimate quantizing parameters qt(j) in the first specific period T.

3. A compression coding apparatus of claim 1, wherein the quantizing parameter updating means sets an initial value of the estimate quantizing parameter so that the sum of the n assigned code quantities bt(j) in the first specific period T is smaller than the specified assigned code quantity BT in the first specific period T, and updates as qt(j)=qt(j)−qs one estimate quantizing parameter qt(j) having a smallest increment of the assigned code quantity bt(j) when the specified amount qs (qs is an arbitrary position rational number) is subtracted from qt(j), among the n estimate quantizing parameters qt(j) in the first specific period T.

4. A compression coding apparatus of claim 1, wherein the quantizing parameter updating means updates as qt(j)= qt(j)+qs one estimate quantizing parameter qt(j) having a largest decrement of the assigned code quantity bt(j) when the specified quantity qs (qs is an arbitrary positive rational number) is added to qt(j), among the n estimate quantizing parameters qt(j) in the first specific period T, when the sum of the n assigned code quantities bt(j) in the first specific period T is greater than the specified code quantity BT assigned in the first specific period T, and updates as qt(j)=qt(j)−qs one estimate quantizing parameter qt(j) having a smallest increment of the assigned code quantity bt(j) when the specified amount qs is subtracted from qt(j), among the n estimate quantizing parameters qt(j) in the first specific period T, when the sum of the n assigned code quantities bt(j) in the first specific period T is smaller than the specified code quantity BT.

5. A compression coding apparatus of claim 1, wherein the quantizing parameter updating means updates only the estimate quantizing parameters qt(j) within a specified range.

6. A compression coding apparatus of claim 5, wherein the code quantity assigning means comprises means for determining a fixed quantizing parameter Qf for keeping same the estimate quantizing parameter qt(j) of the second specific period t (j) over the first specific period T, and making the code quantity of the coded bit streams of the first specific period T equal to the specified assigned code quantity BT, and the specified range is defined by the fixed quantizing parameter Qf.

7. A method for compression coding video signals, comprising the steps of:

quantizing the video signals in quantizing widths proportional to N (N is a specific natural number) temporary quantizing parameters $Q(i)$ (i is a natural number equal to or smaller than N), variable length coding N temporary coded bit streams $S(i)$, measuring a code quantity $B(q, j)$ (j is a natural number of 1 to n) of the temporary coded bit streams $S(i)$ in each of second specific period $t(j)$ which is one of n(n is a natural number) periods divided from a first specific period T, estimating a function $f(q, j)$ and an inverse function $q(b, j)$ (b is an arbitrary code quantity) of the function $f(q, j)$ by relating a quantizing parameter q having continuous values and a code quantity $b(j)$ in the second specific period $t(j)$ with a function of $b(j)=f(q, j)$, by using the temporary quantizing parameter $Q(i)$ and the code quantity $B(q, j)$, determining an assigned code quantity $bt(j)$ to be assigned to the second specific period $t(j)$ so that a code quantity of the coded bit streams in the first specific period T may be equal to a specified assigned code quantity BT assigned in the first specific period T, quantizing the video signals in the second specific period $t(j)$ again to obtain re-quantized data so that the code quantity of the second specific period $t(j)$ may be the assigned code quantity $bt(j)$, and variable length coding the re-quantized to obtain an output coded bit stream.

8. A method for compression coding of claim 7, further comprising a step of determining an estimate quantizing parameter $qt(j)$ to satisfy $qt(j)=g(bt(j), j)$, wherein the step for determining the estimate quantizing parameter $qt(j)$ comprises the steps of:

setting a specific initial parameter qi of the estimate quantizing parameter $qt(j)$, setting the assigned code quantity $bt(j)$ initially as $f(qq, j)$, updating the assigned code quantity $bt(j)$ as a maximum code quantity bm when the assigned code quantity $bt(j)$ is greater than a specific maximum code quantity bm, and updating the estimate quantizing parameter $qt(j)$ as $g(bm, j)$ with respect to the maximum code quantity bm, comparing a sum of n assigned code quantities $bt(j)$ in the first specific period T with the assigned code quantity BT, updating as $qt(j)=qt(j)+qs$ the estimate quantizing parameter $qt(j)$ having a largest decrement of the assigned code quantity $bt(j)$ when the specified quantity qs (qs is an arbitrary positive rational number) is added to the estimate quantizing parameter $qt(j)$, among n estimate quantizing parameters $qt(j)$ in the first specific period T, when the sum of n assigned code quantities $bt(j)$ is greater than the specified code quantity BT, and updating as $qt(j)=qt(j)-qs$ the estimate quantizing parameter $qt(j)$ having a smallest increment of the assigned code quantity $bt(j)$ when the specified amount qs is subtracted from $qt(j)$, among the n quantizing parameters $qt(j)$ in the first specific period T, when the sum of the n assigned code quantities $bt(j)$ is smaller than the specified code quantity BT, updating the assigned code quantity $bt(j)$ as $f(qt(j), j)$ with respect to the estimate quantizing parameter $qt(j)$, and updating the quantizing parameter $qt(j)$ and assigned code quantity $bt(j)$ until the assigned code quantity BT becomes equal to the sum of the n assigned code quantities $bt(j)$, and determining the n quantizing parameters $qt(j)$ in the first specific period T.

9. A method for compression coding of claim 7, wherein the function $f(q, j)$ is a function of $r(j)/q+s(j)$ ($r(j)$ and $s(j)$ are coefficients in the second specific period $t(j)$).

10. A method for compression coding of claim 7, wherein the assigned code quantity $bt(j)$ is in a specific range.

11. A method for compression coding of claim 7, wherein the step of determining determines fixed quantizing parameter Qf for keeping same the estimate quantizing parameter $qt(j)$ in the second specific period t (j) over the first specific period T, and making the estimate code quantity of the coded bit streams of the first specific period T equal to the specified code quantity BT, and determines the estimate quantizing parameter $qt(j)$ in a range defined by the fixed quantizing parameter Qf.

* * * * *